US012638939B2

(12) United States Patent
Yun et al.

(10) Patent No.: US 12,638,939 B2
(45) Date of Patent: May 26, 2026

(54) TOUCH PANEL WITH COMPENSATION TOUCH SENSOR PATTERN AND COMPENSATION DRIVING METHOD THEREOF

(71) Applicant: G2TOUCH Co., LTD., Seongnam-si (KR)

(72) Inventors: Dong Won Yun, Seongnam-si (KR); Hong Geun Ji, Seongnam-si (KR)

(73) Assignee: G2TOUCH Co., LTD., Seongnam-si (KR)

( * ) Notice: Subject to any disclaimer, the term of this patent is extended or adjusted under 35 U.S.C. 154(b) by 0 days.

(21) Appl. No.: 19/057,298

(22) Filed: Feb. 19, 2025

(65) Prior Publication Data

US 2025/0348170 A1 Nov. 13, 2025

(30) Foreign Application Priority Data

May 7, 2024 (KR) ........................ 10-2024-0059638

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...................................................... G06F 3/041
USPC ................................................ 345/173–174
See application file for complete search history.

(56) References Cited

U.S. PATENT DOCUMENTS

| | | | | |
|---|---|---|---|---|
| 2014/0267129 | A1* | 9/2014 | Rebeschi | H03K 17/9622 |
| | | | | 345/174 |
| 2015/0130749 | A1* | 5/2015 | Binstead | G06F 3/04164 |
| | | | | 345/174 |
| 2018/0059866 | A1* | 3/2018 | Drake | G06F 3/0446 |
| 2018/0088721 | A1* | 3/2018 | Moon | G06F 3/0446 |
| 2019/0302947 | A1* | 10/2019 | Moon | G06F 3/0418 |
| 2020/0272329 | A1* | 8/2020 | Tang | G06F 3/04166 |

FOREIGN PATENT DOCUMENTS

| | | | | |
|---|---|---|---|---|
| KR | 10-2013-0126761 A | 11/2013 | | |
| KR | 20170020837 A | * 2/2017 | ......... | G06F 3/0414 |
| KR | 10-2018-0086975 A | 8/2018 | | |
| KR | 10-2019-0081536 A | 7/2019 | | |
| KR | 10-2024-0022121 A | 2/2024 | | |
| WO | WO-2017018650 A1 | * 2/2017 | ......... | G06F 3/041 |
| WO | WO-2022025723 A1 | * 2/2022 | ......... | G06F 3/0418 |

* cited by examiner

*Primary Examiner* — Kwin Xie

(57) ABSTRACT

A touch panel with a compensation touch sensor pattern and a compensation driving method thereof are disclosed. The touch panel includes: a plurality of touch sensors arranged in a matrix of a plurality of rows and a plurality of columns; a plurality of upper compensation touch sensors each disposed to be spaced apart from a corresponding touch sensor in an uppermost row among the plurality of touch sensors; and a plurality of lower compensation touch sensors each disposed to be spaced apart from a corresponding touch sensor in a lowermost row among the plurality of touch sensors. The touch panel with the compensation touch sensor pattern and the compensation driving method thereof can improve touch sensitivity of uppermost and lowermost touch sensors of a touch sensor array in matrix form by employing compensation touch sensors.

6 Claims, 8 Drawing Sheets

Touch sensor
(510)

G

D

S

Row<00>
Control signal
(530)

Row<09>
Driving signal
(540)

560

Touch sensor
(550)

G

D

S

Row<09>
Control signal
(570)

Row<00>
Driving signal
(580)

710 ⟩
Row
⟨upper
compensation⟩

Row⟨00⟩
Row⟨01⟩
Row⟨02⟩
Row⟨03⟩
Row⟨04⟩
Row⟨05⟩
Row⟨06⟩
Row⟨07⟩
Row⟨08⟩
Row⟨09⟩

720

Row
⟨lower
compensation⟩
730

TOUCH PANEL WITH COMPENSATION TOUCH SENSOR PATTERN AND COMPENSATION DRIVING METHOD THEREOF

CROSS-REFERENCE TO RELATED APPLICATION

This application claims priority under 35 U.S.C. § 119 to Korean Patent Application No. 10-2024-0059638 filed on May 7, 2024, in the Korean Intellectual Property Office, the disclosures of which are incorporated by reference herein in their entireties.

TECHNICAL FIELD

Embodiments of the present disclosure relate to a touch panel with a compensation touch sensor pattern and a compensation driving method thereof.

BACKGROUND

FIG. 1 is a plan view of a typical one-layer touch panel 100 including touch sensors arranged in multiple rows and multiple columns.

The touch sensors arranged in multiple rows and multiple columns have different touch sensitivity characteristics depending on the size and location thereof. This is due to the presence of different resistive and capacitive components in each touch sensor depending on the size and location thereof.

Referring to FIG. 1, since there are no adjacent touch sensors disposed before touch sensors 110 of Row<00>, inter-sensor capacitance is only formed between the touch sensors of Row<00> and touch sensors of Row<01> when the touch sensors of Row<00> are activated for touch sensing. Here, inter-sensor capacitance refers to capacitance formed between adjacent touch sensors upon application of a predetermined voltage to one of the touch sensors.

On the other hand, when the touch sensors 110 of Row<01> are activated for touch sensing, inter-sensor capacitance is formed not only between the touch sensors 110 of Row<01> and the touch sensors of Row<00> disposed before Row<01>, but also between the touch sensors 110 of Row<01> and touch sensors of Row<02> disposed after Row<01>.

Accordingly, the touch sensors of Row<00> have a smaller capacitance involved in touch sensing than touch sensors of other rows. As inter-sensor capacitance decreases, touch sensitivity also decreases.

A similar problem occurs in touch sensors of Row<09> of FIG. 1.

In particular, touch sensor [00,00] in Row<00> and touch sensor [07,09] in Row<09> have a smaller capacitance involved in touch sensing than the other touch sensors located in the corresponding rows. This is because there are no touch sensors to the left of [00,00] in Row<00> and no touch sensors to the right of [07,09] in Row<09>.

Decrease in inter-touch sensor capacitance results in loss of touch sensitivity and deterioration in touch characteristics such as temperature characteristics.

FIG. 2 is a plan view of a typical two-layer touch panel 200 including touch sensors arranged in multiple rows and multiple columns.

The touch panel of FIG. 1 is a one-layer touch panel in which touch sensors 110 and sensor signal lines 120 are formed on one transparent conductive film, whereas the touch panel of FIG. 2 is a two-layer touch panel in which touch sensors 210 and sensor signal lines 220 are formed on different transparent conductive films.

Referring to FIG. 2, three touch sensors A, H, F are adjacent to touch sensor C (210) in Row<01> and inter-sensor capacitance is formed between touch sensors A and C, between touch sensors C and H, and between touch sensors C and F during touch sensing after application of a driving signal.

In addition, two sensor signal lines B, G are adjacent to sensor signal line D (220) connected to touch sensor C (210). Accordingly, inter-sensor signal line capacitance is formed between sensor signal lines B and D and between sensor signal lines D and G during touch sensing after application of a driving signal.

Input of driving signals to touch sensors and sensor signal lines adjacent to touch sensor C (210) ensures charge compensation when touch sensor C (210) is activated for touch sensing, thereby enhancing touch sensitivity.

On the other hand, two touch sensors C, E are adjacent to touch sensor A (210) in Row<00>. In addition, only one sensor signal line D is adjacent to sensor signal line B (220) connected to touch sensor A (210).

That is, the number of touch sensors adjacent to touch sensor A (210) in Row<00> is one less than the number of touch sensors adjacent to touch sensor C (210) and the number of sensor signal lines adjacent to a sensor signal line connected to touch sensor A (210) is one less than the number of sensor signal lines adjacent to a sensor signal line connected to touch sensor C (210).

Since the number of touch sensors and sensor lines adjacent to touch sensors of the uppermost row (that is, Row<00>) is smaller than the number of touch sensors and sensor lines adjacent to touch sensors of Row<01> and Row<02>, touch sensors of Row<00> have lower touch sensitivity than the touch sensors of Row<01> and Row<02>. In addition, due to a smaller number of touch sensors adjacent thereto, the touch sensors of the uppermost row are more susceptible to temperature variation, resulting in deterioration in temperature characteristics.

The touch sensors of Row<00> and Row<09> of FIG. 1 and FIG. 2 have a design flaw resulting in reduced inter-sensor capacitance upon touch sensing due to the insufficient number of touch sensors and sensor signal lines adjacent thereto.

SUMMARY

Embodiments of the present disclosure provide a touch panel with a compensation touch sensor pattern, which can reduce deviation in inter-touch sensor capacitance using the compensation touch sensor pattern, thereby compensating for variation in touch sensitivity and reducing variation in touch performance due to environmental changes, and a compensation driving method of the same.

In accordance with one aspect of the present disclosure, there is provided a touch panel with a compensation touch sensor pattern, including:

a plurality of touch sensors arranged in a matrix of multiple rows and multiple columns;

a plurality of upper compensation touch sensors each disposed to be spaced apart from a corresponding touch sensor in an uppermost row among the plurality of touch sensors; and a plurality of lower compensation touch sensors each disposed to be spaced apart from a corresponding touch sensor in a lowermost row among the plurality of touch sensors.

Preferably, the touch panel further includes:

a sensor driver configured to control operation of the plurality of touch sensors, the plurality of upper compensation touch sensors, and the plurality of lower compensation touch sensors and to sense a touch signal from each of the touch sensors; and a plurality of switches each comprising at least one transistor and turning on/off the plurality of touch sensors, the plurality of upper compensation touch sensors, and the plurality of lower compensation touch sensors in response to a control signal from the sensor driver.

Preferably, the touch panel further includes:

a plurality of sensor signal lines each connecting a corresponding touch sensor, a corresponding upper compensation touch sensor, or a corresponding lower compensation touch sensor to one of the plurality of switches.

Preferably, the plurality of touch sensors is activated for touch sensing row by row.

Preferably, when the touch sensors of the uppermost row are activated for touch sensing, a driving signal of the touch sensors of the lowermost row is applied to the plurality of upper compensation touch sensors to form inter-sensor capacitance between the touch sensors of the uppermost row and the upper compensation touch sensors and capacitance between the sensor signal lines connected to the touch sensors of the uppermost row and the sensor signal lines connected to the upper compensation touch sensors to increase touch sensitivity of the touch sensors of the uppermost row.

Preferably, when the touch sensors of the lowermost row are activated for touch sensing, a driving signal of the touch sensors of the uppermost row is applied to the plurality of lower compensation touch sensors to form inter-sensor capacitance between the touch sensors of the lowermost row and the lower compensation touch sensors and capacitance between sensor signal lines connected to the touch sensors of the lowermost row and sensor signal lines connected to the lower compensation touch sensors to increase touch sensitivity of the touch sensors of the lowermost row.

Preferably, the plurality of touch sensors, the plurality of upper compensation touch sensors, the plurality of lower compensation touch sensors, and the sensor signal lines are formed on one transparent conductive film to form a one-layer structure.

Preferably, the plurality of touch sensors, the plurality of upper compensation touch sensors, and the plurality of lower compensation touch sensors are formed on a first transparent conductive film and the sensor signal lines are formed on a second transparent conductive film to form a two-layer structure.

Preferably, the plurality of touch sensors is formed in an active area of the touch panel, and the plurality of upper compensation touch sensors and the plurality of lower compensation touch sensors are formed in an inactive area of the touch panel.

In accordance with another aspect of the present disclosure, there is provided a compensation driving method of a touch panel with a compensation touch sensor pattern, wherein the touch panel includes: a plurality of touch sensors arranged in a matrix of multiple rows and multiple columns; a plurality of upper compensation touch sensors each disposed to be spaced apart from a corresponding touch sensor in an uppermost row among the plurality of touch sensors; and a plurality of lower compensation touch sensors each disposed to be spaced apart from a corresponding touch sensor in a lowermost row among the plurality of touch sensors.

The compensation driving method includes:

turning on touch sensors of a predetermined row to detect whether at least one touch sensor located in the predetermined row is touched; and applying at least one driving signal to one or more touch sensors located in one or more rows before and after the predetermined row, one or more upper compensation touch sensors, or one or more lower compensation touch sensors, wherein a first driving signal is applied to the plurality of upper compensation touch sensors only when the touch sensors of the uppermost row are turned on, and a second driving signal is applied to the plurality of lower compensation touch sensors only when the touch sensors of the lowermost row are turned on.

Preferably, when the first driving signal is applied to the plurality of upper compensation touch sensors, inter-sensor capacitance is formed between the touch sensors of the uppermost row and the upper compensation touch sensors to increase touch sensitivity of the touch sensors of the uppermost row.

Preferably, when the second driving signal is applied to the plurality of lower compensation touch sensors, inter-sensor capacitance is formed between the touch sensors of the lowermost row and the lower compensation touch sensors to increase touch sensitivity of the touch sensors of the lowermost row.

Embodiments of the present disclosure provide a touch panel with a compensation touch sensor pattern, which can improve touch sensitivity of uppermost and lowermost touch sensors of a touch sensor array in a matrix form by employing compensation touch sensors, and a compensation driving method thereof.

The touch panel with the compensation touch sensor pattern and the compensation driving method thereof can be applied to both a one-layer touch panel and a two-layer touch panel.

BRIEF DESCRIPTION OF THE DRAWINGS

The above and other aspects, features, and advantages of the present invention will become apparent from the detailed description of the following embodiments in conjunction with the accompanying drawings:

FIG. 2 is a plan view of a typical two-layer touch panel (200) including touch sensors arranged in multiple rows and multiple columns;

FIG. 3 is a plan view of a touch panel (300) with a compensation touch sensor pattern according to the present disclosure, illustrating an embodiment applied to a one-layer touch panel;

DETAILED DESCRIPTION OF EMBODIMENTS

Figure 1:
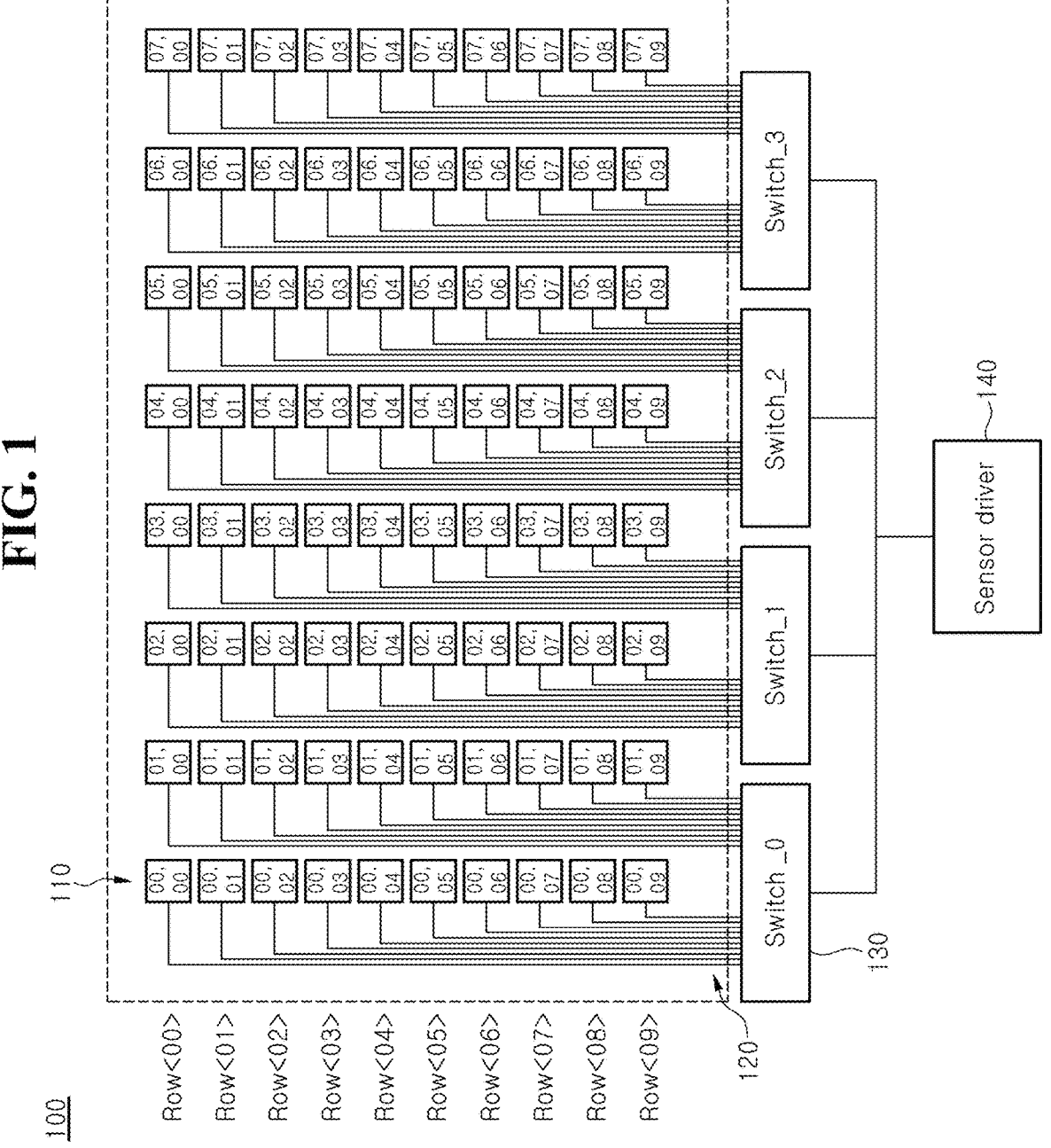
FIG. 1 is a plan view of a typical one-layer touch panel (100) including touch sensors arranged in multiple rows and multiple columns.

Hereinafter, exemplary embodiments of the present invention will be described with reference to the accompanying drawings.

A touch panel according to embodiments of the present disclosure may be used not only in mobile devices such as smartphones, PDAs, and PMPs, but also in various types of electronic devices such as navigation devices, netbooks, notebooks, DIDs, and IPTVs.

The touch panel according to embodiments of the present disclosure may be attached to or embedded in various types of displays such as LCDs, PDPs, and OLEDs.

Figure 3:
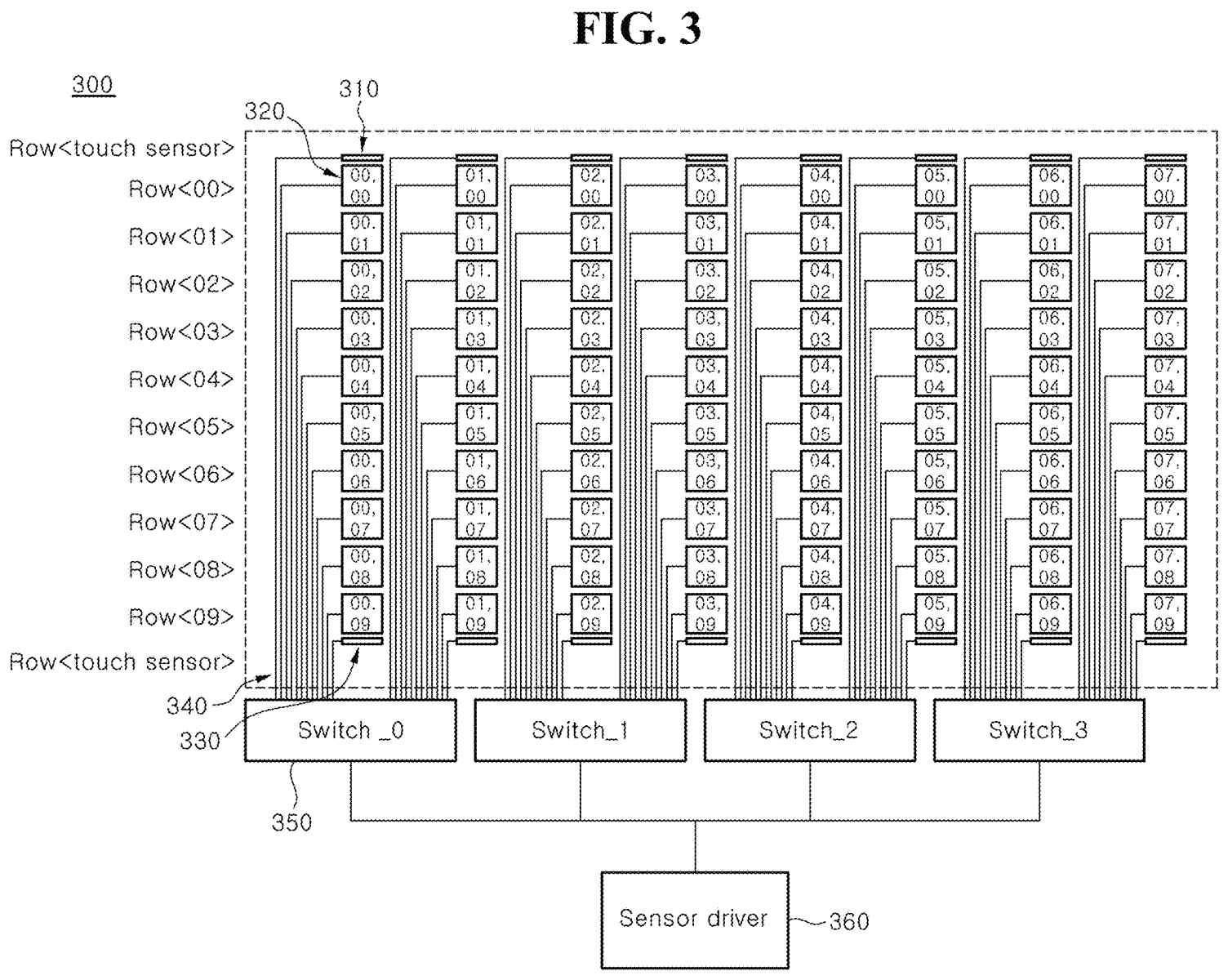

FIG. 3 is a plan view of a touch panel 300 with a compensation touch sensor pattern according to the present disclosure, illustrating an embodiment applied to a one-layer touch panel.

In accordance with one aspect of the present disclosure, a touch panel 300 with a compensation touch sensor pattern includes: a plurality of touch sensors 320 arranged in a matrix of multiple rows and multiple columns; a plurality of upper compensation touch sensors 310 each disposed to be spaced apart from a corresponding one of touch sensors [00,00 to 07,00] of an uppermost row among the plurality of touch sensors 320; and a plurality of lower compensation touch sensors 310 each disposed to be spaced apart from a corresponding one of touch sensors [00,09 to 07,09] of a lowermost row among the plurality of touch sensors 320.

The touch panel 300 with the compensation touch sensor pattern according to one embodiment of the present disclosure further includes: a sensor driver 360 configured to control operation of the plurality of touch sensors 320, the plurality of upper compensation touch sensors 310, and the plurality of lower compensation touch sensors 330 and to sense a touch signal from each touch sensor 320.

The touch panel 300 with the compensation touch sensor pattern according to one embodiment of the present disclosure further includes: a plurality of switches 350 (switch_0 to switch_3) each including at least one transistor and turning on/off the plurality of touch sensors 320, the plurality of upper compensation touch sensors 310, and the plurality of lower compensation touch sensors 330 in response to a control signal from the sensor driver 360.

In addition, the touch panel 300 with the compensation touch sensor pattern according to one embodiment of the present disclosure further includes: a plurality of sensor signal lines 340 each connecting a corresponding touch sensor 320, a corresponding upper compensation touch sensor 310, or a corresponding lower compensation touch sensor 330 to one of the plurality of switches 350.

In the touch panel 300 shown in FIG. 3, the plurality of touch sensors 320, the plurality of upper compensation touch sensors 310, the plurality of lower compensation touch sensors 330, and the plurality of sensor signal lines 340 are formed on one transparent conductive film to form a one-layer structure.

In the touch panel 300 with the compensation touch sensor pattern according to one embodiment of the present disclosure, the plurality of touch sensors 320 is activated for touch sensing row by row.

Unlike the typical touch panel shown in FIG. 1, the touch panel according to the present disclosure includes a plurality of upper compensation touch sensors each disposed before a corresponding one of touch sensors [00,00 to 07,00] of an uppermost row and a plurality of lower compensation touch sensors each disposed after a corresponding one of touch sensors [00,09 to 07,09] of a lowermost row.

In one embodiment, the touch panel 300 according to the present disclosure may be configured such that the plurality of touch sensors 320 is disposed in an active area of the touch panel and the plurality of upper compensation touch sensors 310 and the plurality of lower compensation touch sensors 330 are disposed in an inactive area of the touch panel.

The size and shape of the plurality of upper compensation touch sensors 310 and the plurality of lower compensation touch sensors 330 according to the present disclosure are not particularly restricted.

A distance between the plurality of upper compensation touch sensors 310 and the touch sensors [00,00 to 07,00] of the uppermost row is equal to a distance between adjacent rows of the array of touch sensors 320.

Similarly, a distance between the plurality of lower compensation touch sensors 330 and the touch sensors [00,09 to 07,09] of the lowermost row is equal to a distance between adjacent rows of the array of touch sensors 320.

In one embodiment, when the touch sensors 320 [00,09 to 07,09] of the uppermost row are activated for touch sensing, a driving signal of the touch sensors 320 [00,00 to 07,00] of the lowermost row is applied to the plurality of upper compensation touch sensors 310 to form inter-sensor capacitance between the touch sensors of the uppermost row and the upper compensation touch sensors and capacitance between the sensor signal lines connected to the touch sensors of the uppermost row and the sensor signal lines connected to the upper compensation touch sensors, thereby increasing touch sensitivity of the touch sensors of the uppermost row.

In one embodiment, when the touch sensors 320 [00,09 to 07,09] of the lowermost row are activated for touch sensing, a driving signal of the touch sensors 320 [00, 00 to 07,00] of the uppermost row is applied to the plurality of lower compensation touch sensors 330 to form inter-sensor capacitance between the touch sensors of the lowermost row and the lower compensation touch sensors and capacitance between the sensor signal lines connected to the touch sensors of the lowermost row and the sensor signal lines connected to the lower compensation touch sensors, thereby increasing touch sensitivity of the touch sensors of the lowermost row.

Figure 4:
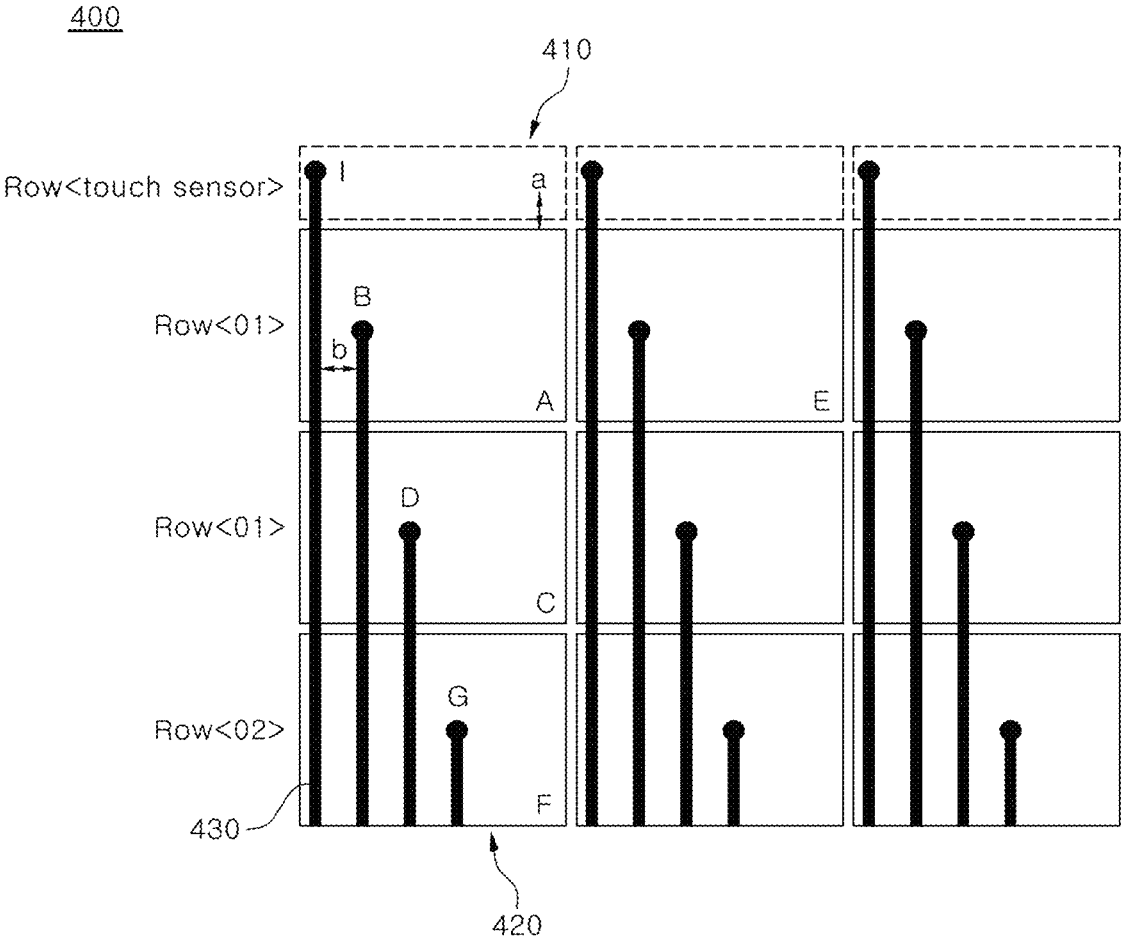
FIG. 4 is a plan view of a touch panel (400) with a compensation touch sensor pattern according to the present disclosure, illustrating an embodiment applied to a two-layer touch panel.

FIG. 4 is a plan view of a touch panel 400 with a compensation touch sensor pattern according to the present disclosure, illustrating an embodiment applied to a two-layer touch panel.

The touch panel 400 with the compensation touch sensor pattern according to the present disclosure may be configured in a two-layer structure.

That is, a plurality of touch sensors 420, a plurality of upper compensation touch sensors 410, and a plurality of lower compensation touch sensors are formed on a first transparent conductive film and a plurality of sensor signal lines 430 is formed on a second transparent conductive film to form a two-layer structure.

Figure 2:
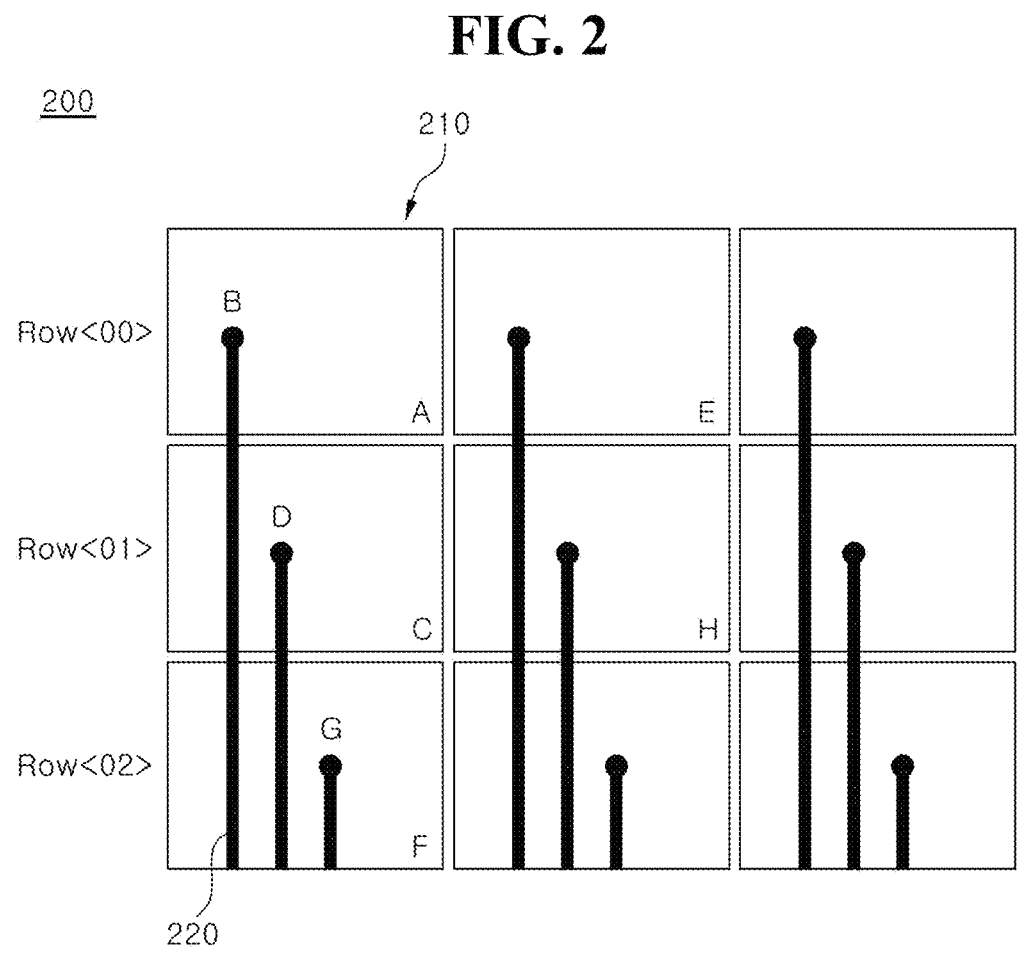

Unlike the typical touch panel 200 of FIG. 2, the touch panel 400 with the compensation touch sensor pattern according to the present disclosure includes upper compensation touch sensor I 410 above touch sensor A 420.

Referring to FIG. 4, due to the presence of the upper compensation touch sensor 410, capacitance a is formed between upper compensation touch sensor I 410 and touch sensor A 420 and capacitance b is formed between a signal line connected to upper compensation touch sensor I and sensor signal line B.

Touch sensitivity of touch sensor A 420 during touch sensing is enhanced by capacitance a and capacitance b formed upon application of a driving signal.

Although not shown in FIG. 4, it can be inferred that touch sensitivity of touch sensors of the lowermost row will also be enhanced by inter-sensor capacitance formed between the touch sensors of the lowermost row and the lower compensation touch sensors and capacitance formed between sensor signal lines connected to the touch sensors of the lowermost row and sensor signal lines connected to the lower compensation touch sensors.

The upper compensation touch sensors 410 and the lower compensation touch sensors are basically activated only by driving signals similar to a square wave.

Apart from the driving signals, no sensing signals for touch sensing are applied to the upper compensation touch sensors.

Since only the driving signals for compensating for variation in touch sensitivity are input to the upper compensation touch sensors 410 and the lower compensation touch sensors, it is possible to eliminate the need for additional sensor channels or additional computational time and resources.

Figure 5A:
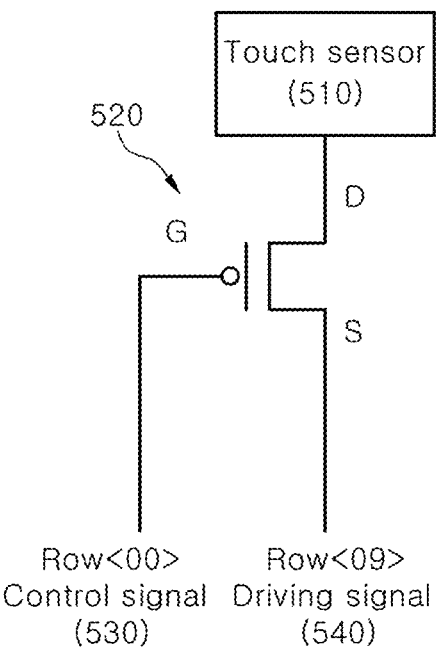
FIG. 5A is a schematic diagram of a switch circuit configured to control a plurality of upper compensation touch sensors according to the present disclosure.

FIG. 5A is a schematic diagram of a switch circuit configured to control a plurality of upper compensation touch sensors according to the present disclosure.

Driving signals applied to each touch sensor, the upper compensation touch sensor, and the lower compensation touch sensor and corresponding control signals thereof are different for each row of the touch sensors.

FIG. 5A shows operation of a switch circuit configured to control a plurality of upper compensation touch sensors according to the present disclosure.

A driving signal is applied to compensate for variation in touch sensitivity when touch sensors of Row<00> are activated for touch sensing. Specifically, driving signals are simultaneously applied to touch sensors of Row<01>, touch sensors of Row<02>, touch sensors of Row<08>, and touch sensors of Row<09>.

In the present disclosure, a driving signal of the touch sensors of Row<09> is applied to an upper compensation touch sensor 510.

As described above, as the driving signal is applied to the upper compensation touch sensor 510, inter-sensor capacitance is formed between the upper compensation touch sensor 510 and a corresponding touch sensor in Row<00>.

The driving signal 540 of the touch sensors of Row<09> is applied to the upper compensation touch sensor 510 only when the touch sensors of Row<00> are activated for touch sensing.

No driving signal is applied to the upper compensation touch sensor 510 when touch sensors other the touch sensors of Row<00> are activated for touch sensing.

To ensure that the driving signal of the touch sensors of Row<09> is applied only when the touch sensors of Row<00> are activated for touch sensing, a control signal 530 for the touch sensors of Row<00> is connected to a gate of a transistor 520 of a switch connected to the upper compensation touch sensor 510, as shown in FIG. 5A.

The driving signal of the touch sensors of Row<09> is applied to the upper compensation touch sensor 510 only when the gate of the transistor is turned on.

Figure 5B:
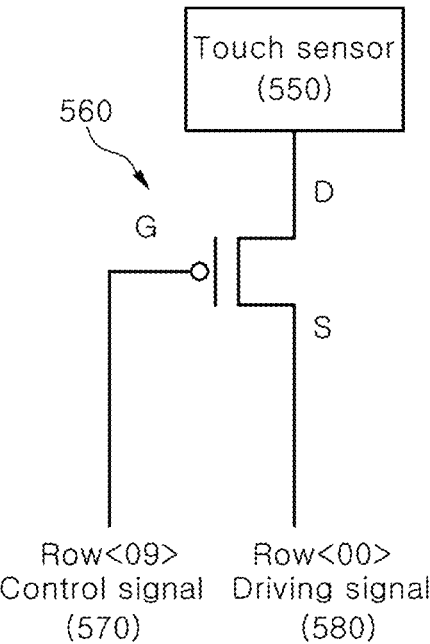
FIG. 5B is a schematic diagram of a switch circuit configured to control a plurality of lower compensation touch sensors according to the present disclosure.

FIG. 5B is a schematic diagram of a switch circuit configured to control a plurality of lower compensation touch sensors according to the present disclosure.

Referring to FIG. 5B, a driving signal 580 of touch sensors of Row<00> is applied to a lower compensation touch sensor 550 only when touch sensors of Row<09> (lowermost touch sensors) are activated for touch sensing.

No driving signal is applied to the lower compensation touch sensor 550 when touch sensors other than the touch sensors of Row<09> are activated for touch sensing.

To ensure that the driving signal of the touch sensors of Row<00> is applied to the lower compensation touch sensor 550 only when the touch sensors of Row<09> are activated for touch sensing, a control signal 570 for the touch sensors of Row<09> is connected to a gate of a transistor 560 of a switch connected to the lower compensation touch sensor 550, as shown in FIG. 5B.

The driving signal 580 of the touch sensors of Row<00> is applied to the lower compensation touch sensor 550 only when the gate of the transistor is turned on.

By preventing the upper compensation touch sensor/the lower compensation touch sensor from being driven when touch sensors other than the touch sensors of Row<00>/Row<09> are activated for touch sensing, radiation of EMI can be suppressed.

In the touch panel according to the present disclosure, touch sensing signals or driving signals are output from the sensor driver 360 (see FIG. 3).

The touch sensing signals or the driving signals are controlled by the transistor in the switch.

The switch may be embedded inside a touch integrated circuit (IC), or may be embedded in the touch panel. The switch may include hundreds of muxes to control switching of each sensor channel.

In one embodiment, the sensor driver 360 is configured to output negative voltage to turn a signal on and output positive voltage to turn a signal off so as to control the muxes in the switch 350.

Figure 6:
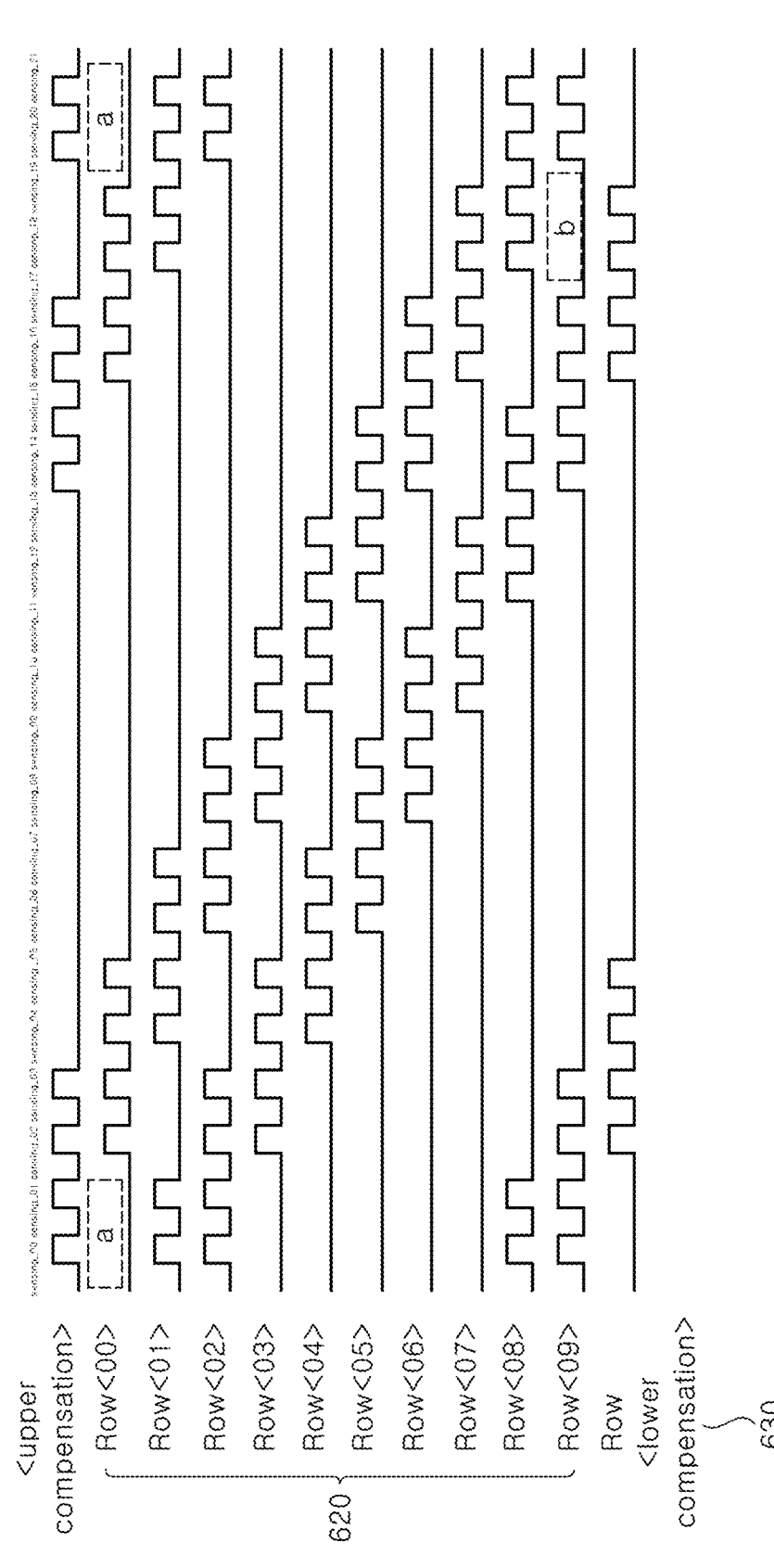
FIG. 6 is a timing diagram of driving signals output from a sensor driver according to the present disclosure.

FIG. 6 is a timing diagram of driving signals output from the sensor driver according to the present disclosure.

FIG. 6 shows the timing of driving signals output from the sensor driver.

In FIG. 6, sensing timing of touch sensors of Row<00> is denoted by "a". At timing "a", respective driving signals of ROW<upper compensation touch sensor>, Row<00>, Row<01>, Row<02>, Row<08>, and Row<09> are output from the sensor driver and are simultaneously applied to touch sensors of Row<01>, touch sensors of Row<02>, touch sensors of Row<08>, and touch sensors of Row<09>.

Figure 7:
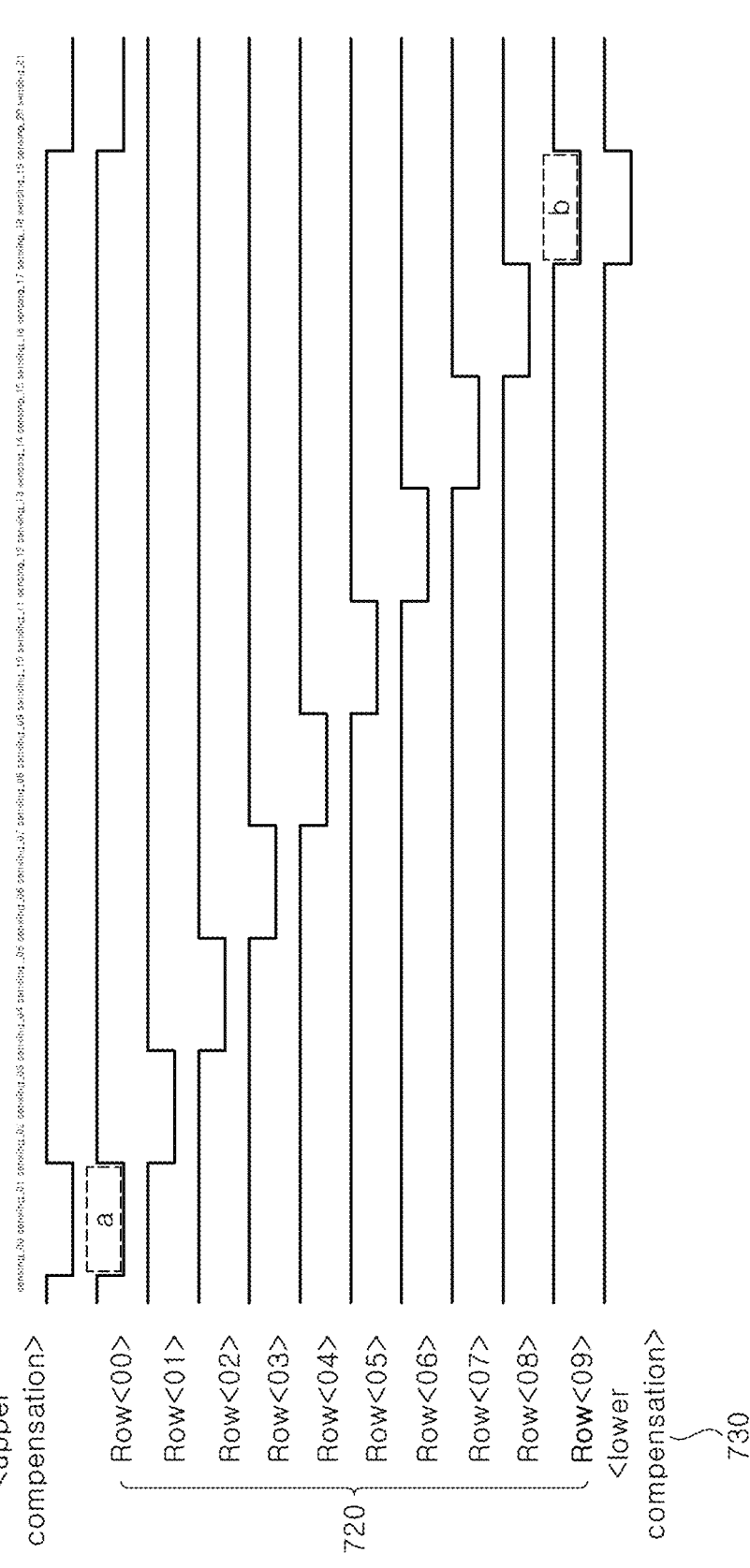
FIG. 7 is a timing diagram of mux control signals output from the sensor driver according to the present disclosure.

FIG. 7 is a timing diagram of mux control signals output from the sensor driver according to the present disclosure.

FIG. 7 shows the timing of control signals for turning muxes on/off.

Referring to FIG. 7, at timing "a", at which touch sensors of Row<00> are activated (see FIG. 6), negative voltage is only applied to Row<00> and Row<upper compensation touch sensor> to turn muxes on. When the muxes are turned on, a driving signal is applied to touch sensors of Row<upper compensation touch sensor>.

Figure 8:
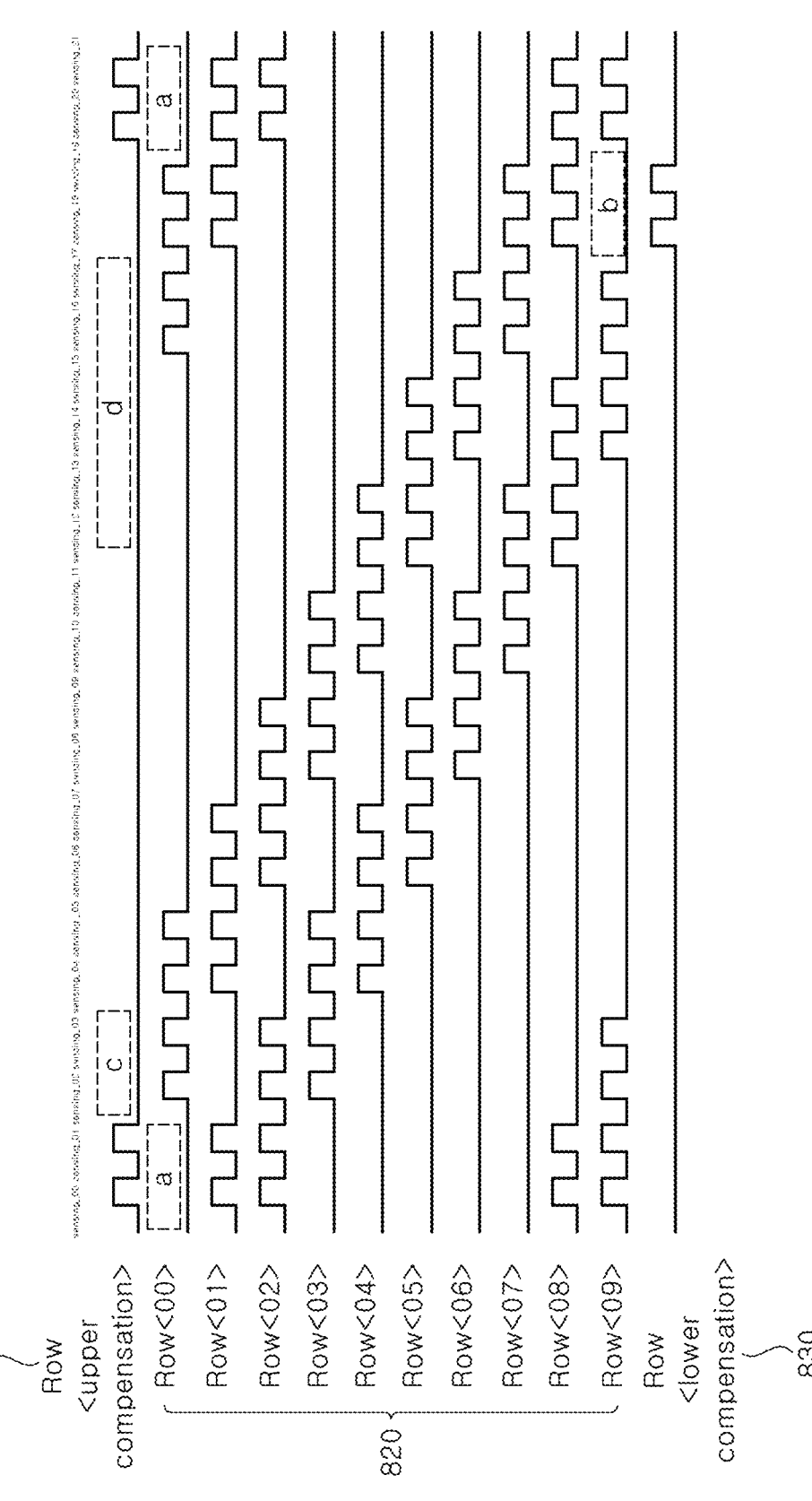
FIG. 8 is a timing diagram of upper compensation touch sensor control signals output from the sensor driver according to the present disclosure.

FIG. 8 is a timing diagram of upper compensation touch sensor control signals output from the sensor driver according to the present disclosure.

Referring to FIG. 8, a driving signal is applied to Row<upper compensation touch sensor> only at timing "a", at which touch sensors of Row<00> are activated. That is, it can be seen that some driving signals output in FIG. 6 are turned off and no driving signal is applied at timings "c" and "d" due to control signals.

Utilization of these control signals allows effective operation of Row<upper compensation touch sensor> and Row<lower compensation touch sensor>, thereby preventing problems such as space constraint, increased EMI radiation, and deteriorated touch performance, despite addition of sensors.

In addition, the touch panel with the compensation touch sensor according to the present disclosure can enhance touch sensitivity of uppermost and lowermost touch sensors and can reduce touch sensitivity deviation due to temperature changes.

In accordance with another aspect of the present disclosure, a compensation driving method of a touch panel with a compensation touch sensor pattern includes: turning on touch sensors of a predetermined row to detect whether at least one touch sensor located in the predetermined row is touched; and applying at least one driving signal to one or more touch sensors located in one or more rows before and after the predetermined row, one or more upper compensation sensors, or one or more lower compensation touch sensors.

A first driving signal is applied to the plurality of upper compensation touch sensors only when touch sensors of an uppermost row are turned on, and a second driving signal is applied to the plurality of lower compensation touch sensors only when touch sensors of a lowermost row are turned on.

In one embodiment, when the first driving signal is applied to the plurality of upper compensation touch sensors, inter-sensor capacitance is formed between the touch sensors of the uppermost row and the upper compensation touch sensors, thereby enhancing touch sensitivity of the touch sensors of the uppermost row.

Similarly, when the second driving signal is applied to the plurality of lower compensation touch sensors, inter-sensor capacitance is formed between the touch sensors of the lowermost row and the lower compensation touch sensors, thereby enhancing touch sensitivity of the touch sensors of the lowermost row.

Although the present disclosure has been described with reference to some embodiments in conjunction with the accompanying drawings, the present disclosure is not limited thereto. It will be apparent to a person having ordinary knowledge in the art that various modifications, changes, alterations, and equivalent embodiments can be made without departing from the spirit and scope of the present disclosure.

The invention claimed is:

1. A touch panel with a compensation touch sensor pattern, comprising:

a plurality of touch sensors arranged in a matrix of multiple rows and multiple columns;

a plurality of upper compensation touch sensors each disposed to be spaced apart from a corresponding touch sensor in an uppermost row among the plurality of touch sensors;

a plurality of lower compensation touch sensors each disposed to be spaced apart from a corresponding touch sensor in a lowermost row among the plurality of touch sensors;

a sensor driver configured to control operation of the plurality of touch sensors, the plurality of upper compensation touch sensors, and the plurality of lower compensation touch sensors and to sense a touch signal from each of the touch sensors;

a plurality of switches each comprising at least one transistor and turning on/off the plurality of touch sensors, the plurality of upper compensation touch sensors, and the plurality of lower compensation touch sensors in response to a control signal from the sensor driver; and a plurality of sensor signal lines each connecting a corresponding touch sensor, a corresponding upper compensation touch sensor, or a corresponding lower compensation touch sensor to one of the plurality of switches, wherein, when the touch sensors of the uppermost row are activated for touch sensing, a driving signal of the touch sensors of the lowermost row is applied to the plurality of upper compensation touch sensors to form inter-sensor capacitance between the touch sensors of the uppermost row and the upper compensation touch sensors and capacitance between the sensor signal lines connected to the touch sensors of the uppermost row and the sensor signal lines connected to the upper compensation touch sensors to increase touch sensitivity of the touch sensors of the uppermost row, and wherein, when the touch sensors of the lowermost row are activated for touch sensing, a driving signal of the touch sensors of the uppermost row is applied to the plurality of lower compensation touch sensors to form inter-sensor capacitance between the touch sensors of the lowermost row and the lower compensation touch sensors and capacitance between the sensor signal lines connected to the touch sensors of the lowermost row and the sensor signal lines connected to the lower compensation touch sensors to increase touch sensitivity of the touch sensors of the lowermost row.

2. The touch panel according to claim 1, wherein the plurality of touch sensors is activated for touch sensing row by row.

3. The touch panel according to claim 1, wherein the plurality of touch sensors, the plurality of upper compensation touch sensors, the plurality of lower compensation touch sensors, and the sensor signal lines are formed on one transparent conductive film to form a one-layer structure.

4. The touch panel according to claim 1, wherein the plurality of touch sensors, the plurality of upper compensation touch sensors, and the plurality of lower compensation touch sensors are formed on a first transparent conductive film and the sensor signal lines are formed on a second transparent conductive film to form a two-layer structure.

5. The touch panel according to claim 1, wherein the plurality of touch sensors is formed in an active area of the touch panel, and the plurality of upper compensation touch sensors and the plurality of lower compensation touch sensors are formed in an inactive area of the touch panel.

6. A compensation driving method of a touch panel with a compensation touch sensor pattern, the touch panel comprising: a plurality of touch sensors arranged in a matrix of multiple rows and multiple columns; a plurality of upper compensation touch sensors each disposed to be spaced apart from a corresponding touch sensor in an uppermost row among the plurality of touch sensors; and a plurality of lower compensation touch sensors each disposed to be spaced apart from a corresponding touch sensor in a lowermost row among the plurality of touch sensors, the compensation driving method comprising:

turning on touch sensors of a predetermined row to detect whether at least one touch sensor located in the predetermined row is touched; and applying at least one driving signal to one or more touch sensors located in one or more rows before and after the predetermined row, one or more upper compensation touch sensors, or one or more lower compensation touch sensors, wherein a first driving signal is applied to the plurality of upper compensation touch sensors only when the touch sensors of the uppermost row are turned on, and a second driving signal is applied to the plurality of lower compensation touch sensors only when the touch sensors of the lowermost row are turned on, wherein, when the first driving signal is applied to the plurality of upper compensation touch sensors, inter-sensor capacitance is formed between the touch sensors of the uppermost row and the upper compensation touch sensors to increase touch sensitivity of the touch sensors of the uppermost row, and the first driving signal is a driving signal of the touch sensors of the lowermost row, and wherein, when the second driving signal is applied to the plurality of lower compensation touch sensors, inter-sensor capacitance is formed between the touch sensors of the lowermost row and the lower compensation touch sensors to increase touch sensitivity of the touch sensors of the lowermost row, and the second driving signal is a driving signal of the touch sensors of the uppermost row.

* * * * *